Jan. 5, 1937.  Y. SMITH-STANGE  2,066,654
HANDCUFF
Filed May 13, 1935

Inventor
Yngve Smith-Stange
BY
Parker, Carlsen, Pitzner & Hubbard
Attorneys.

Patented Jan. 5, 1937

2,066,654

UNITED STATES PATENT OFFICE 2,066,654

HANDCUFF

Yngve Smith-Stange, Chicago, Ill., assignor to Argus Manufacturing Company, Chicago, Ill., a corporation of Illinois Application May 13, 1935, Serial No. 21,078

2 Claims. (Cl. 70—24)

The invention relates to handcuffs adapted for use by police officers and more particularly to the type comprising a pair of jaws pivotally supported by a body member, a rotatable operator for moving said jaws to open and closed positions, and a sleeve rotatable with said operator and having ratchet teeth engageable with corresponding teeth on the body member and adapted to prevent opening of the jaws except when desired.

In prior constructions having the teeth exposed, the sleeve is ordinarily grasped between two fingers to disengage the ratchet teeth for opening the jaws, and in so doing, the fingers press against the ratchet teeth. Due to the sharpness of these teeth, the fingers are apt to be pinched and cut or otherwise injured.

The general object of the invention is therefore to provide a construction in which the fingers cannot come in contact with the ratchet teeth when moving the sleeve.

Other objects and advantages will become apparent from the following description taken in connection with the accompanying drawing, in which.

Figure 1:
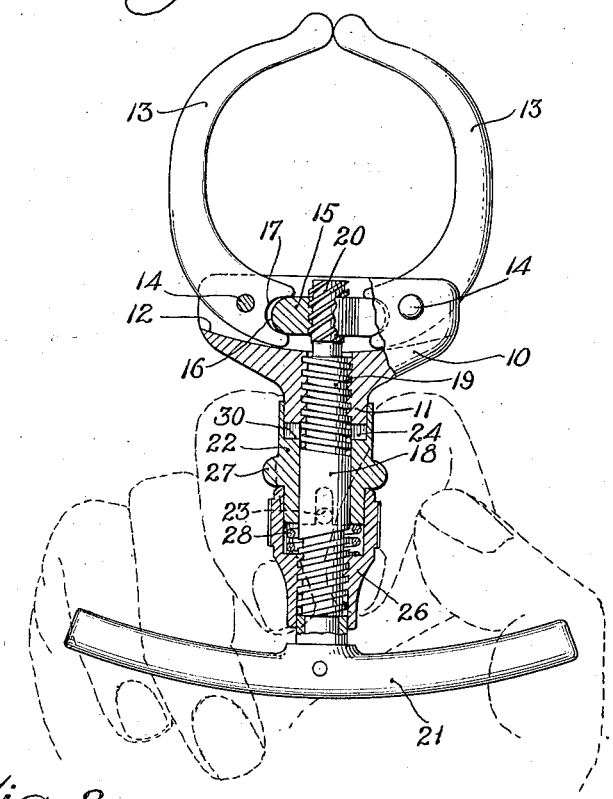
Figure 1 is a view partially in section of a handcuff embodying the features of the invention, and showing the ratchet teeth in their engaged position.
Figure 2:
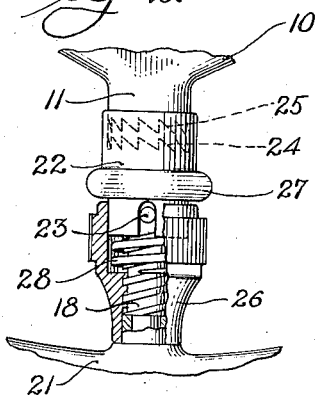
Fig. 2 is a fragmentary view similar to Fig. 1 but showing the teeth in disengaged position.
Figure 3:
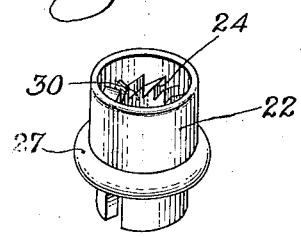
Fig. 3 is a perspective view of a part of the device.

As illustrated herein, the type of handcuff in which the present invention is embodied comprises a body 10 having a cylindrical hub 11 extending therefrom and a transverse elongated slot 12. A pair of curved jaws 13 have their inner ends positioned within the slot 12 and are secured therein by means of pivot pins 14. The operating means for the jaws 13 comprises an actuating member 15 interposed between the ends of the jaws 13 within the slot 12. The actuating member 15 is provided with rounded ends 16 engaging in sockets 17 formed in the inner ends of the jaws.

To operate the actuating member 15, a rotary shaft or spindle 16 extends axially through the hub 11 and into the slot 12 for engagement with the actuating member 15. The spindle 18 is adapted to move the actuating member 15 to swing the jaws, and for this purpose has a screw-threaded engagement with the body 10 by means of the threads 19, and a similar engagement with the actuating member 15 through the medium of threads 20. The threads 20 are of opposite pitch to that of the threads 19 so that upon rotation of the spindle, the actuating member 15, which is held against rotation by the body, is moved longitudinally of the spindle, thus swinging the jaws 13. Preferably, the threads 20 are of a steep pitch in order to give the actuating member a relatively large longitudinal movement for a small rotative movement of the spindle, such that, for example, the jaws will move through their complete range for a half a turn of the spindle. The spindle 18 projects well beyond the body and on its outer end has a handle bar 21 by which it may be readily turned.

To hold the jaws in their closed position, a ratchet device is provided which prevents rotation of the spindle in an opening direction except when released. To this end, a ratchet sleeve 22 is mounted on the spindle 18 for rotation therewith but is slidable longitudinally thereof for a limited distance, a pin and slot connection 23 between the sleeve and spindle being provided for this purpose. The sleeve 22 has formed thereon ratchet teeth 24 cooperating with similar ratchet teeth 25 formed on the end of the hub 11. To lock both sets of ratchet teeth in engagement and thus prevent rotation of the spindle in either direction, a locking sleeve 26 is threaded on the spindle 18 and is adapted to be turned into engagement with a shoulder or rib 27 on the ratchet sleeve 22. When the locking sleeve 26 is turned out of engagement with the ratchet sleeve, a coil spring 28 mounted on the spindle and enclosed by the locking sleeve bears against the ratchet sleeve and yieldingly holds the ratchet teeth in engagement. The teeth on the ratchet sleeve may, however, be moved out of engagement with the teeth on the body 11, against the action of the spring, in order to open the jaws 13.

The principal feature of my invention is to provide a construction in which the ratchet teeth are enclosed so that the fingers cannot come in contact with them when the handle bar 21 is grasped in the palm of the hand and the sleeve 22 extends between the fingers as shown in Fig. 1. To this end, the hub 11 and the ratchet sleeve are constructed so that one telescopes within the other, with the ratchet teeth of both within the telescoping portions. Thus, the interengagement of the teeth is permitted but they are so enclosed that the fingers are kept out of contact with the teeth.

In the preferred construction, the sleeve 22 is formed with an internal shoulder 30 in which the teeth are cut, and the portion of the sleeve projecting beyond the shoulder has an internal diameter permitting it to telescope over the end of the hub 11. The length of the sleeve is sufficient to extend beyond the ratchet teeth 25 on the hub for such a distance that, even when the teeth 24 are disengaged from the teeth 25, the latter are completely enclosed by the collar 30.

When the device so constructed is grasped in the hand with the sleeve 22 extending between the fingers, the sleeve provides a smooth external surface against which the fingers press. Since the sleeve 22 extends over and encloses the teeth 25 on the hub, even when the hub and sleeve are separated to permit relative rotation therebetween, the fingers are prevented from coming in contact with the ratchet teeth and thus cannot be cut or otherwise injured thereby.

I claim as my invention:

1. In a handcuff comprising a body member, a pair of pivoted jaws therein, and a rotatable operator for said jaws, the combination of a hub on said body coaxial with said operator and having ratchet teeth on its outer end, and a sleeve on said operator rotatable with but axially slidable relative to the operator and having an internal shoulder provided with ratchet teeth coacting with said first-mentioned ratchet teeth, said sleeve being adapted to be grasped between the fingers for separating the ratchet teeth to release the jaws and telescoping over said hub, said sleeve having sufficient length to cover said ratchet teeth to prevent the fingers from contacting said ratchet teeth.

2. In a handcuff comprising a body member, a pair of pivoted jaws therein, and a rotatable operator for said jaws, the combination of a hub portion on said body member rotatably supporting said operator, and a sleeve on said operator rotatable with but axially slidable relative to said operator and having a portion extending adjacent said hub portion, said portions having coacting ratchet teeth with one of said portions telescoping over the other to completely enclose the ratchet teeth and providing a smooth surface adapted to be positioned between the fingers, the outer of said portions being dimensioned to prevent contact of the fingers with other parts of the device.

YNGVE SMITH-STANGE.